United States Patent
Goguet-Chapuis et al.

(10) Patent No.: US 9,428,278 B2
(45) Date of Patent: Aug. 30, 2016

(54) VALVE FOR FUEL CIRCUIT OF AN AIRCRAFT ENGINE

(71) Applicant: SNECMA, Paris (FR)

(72) Inventors: Benjamin Andre Goguet-Chapuis, Paris (FR); Benjamin Bregani, Alfortville (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 14/560,463

(22) Filed: Dec. 4, 2014

(65) Prior Publication Data

US 2015/0159771 A1    Jun. 11, 2015

(30) Foreign Application Priority Data

Dec. 5, 2013    (FR) ..................... 13 62187

(51) Int. Cl.
| | |
|---|---|
| *F02C 7/232* | (2006.01) |
| *B64D 37/04* | (2006.01) |
| *F02C 7/236* | (2006.01) |

(52) U.S. Cl.
CPC ............... *B64D 37/04* (2013.01); *F02C 7/232* (2013.01); *F02C 7/236* (2013.01); *Y10T 137/777* (2015.04)

(58) Field of Classification Search
CPC ............. F16K 31/1221; F16K 31/124; F16K 31/1223; F16K 31/122; F16K 99/0059; B64D 37/04; F02C 7/232
See application file for complete search history.

(56) References Cited

U.S. PATENT DOCUMENTS

| | | |
|---|---|---|
| 5,896,737 A | 4/1999 | Dyer |
| 7,007,452 B1 | 3/2006 | Baryshnikov et al. |

(Continued)

FOREIGN PATENT DOCUMENTS

| | | |
|---|---|---|
| EP | 0 886 054 A2 | 12/1998 |
| EP | 2 644 864 A2 | 10/2013 |

(Continued)

OTHER PUBLICATIONS

French Preliminary Search Report issued Jul. 28, 2014 in Patent Application No. FR 1362187 (with English Translation of Category of Cited Documents).

*Primary Examiner* — Lindsay Low
*Assistant Examiner* — Jacob Amick
(74) *Attorney, Agent, or Firm* — Oblon, McClelland, Maier & Neustadt, L.L.P.

(57) ABSTRACT

The invention relates to a motive flow valve (30) for aircraft engine comprising:
- a shaft (31) comprising a high-pressure chamber (36), a low-pressure chamber (33), a fuel inlet (42), a fuel outlet (44), and a shoulder (45) arranged between the fuel inlet and the fuel outlet, defining an abutment surface (46),
- a drawer (55) configured to be displaced relatively to the shaft under the effect of a difference in pressure between the high- and low-pressure chambers, between a closed position wherein the drawer abuts with the abutment surface in the closed position and obstructs the fuel inlet, and an open position wherein the drawer releases the fuel inlet,
- with the drawer comprising a portion extending into an intermediate chamber (39), the drawer further comprising a channel (62) exiting on the one hand in a first portion (63) of the intermediate chamber and communicating with the fuel outlet in the open and closed positions, and on the other hand in a second portion (64) of the intermediate chamber that does not communicate with the fuel inlet or with the fuel outlet in the open and closed positions, and
- a sealing element (59) interposed between the abutment surface and the drawer in the closed position.

9 Claims, 5 Drawing Sheets

(56) References Cited

U.S. PATENT DOCUMENTS

2005/0279079 A1 12/2005 Baryshnikov et al.
2007/0017206 A1 1/2007 Baryshnikov et al.
2011/0107768 A1 5/2011 Niemeyer et al.
2013/0255270 A1 10/2013 Gibbons et al.

FOREIGN PATENT DOCUMENTS

| FR | 2 923 861 A1 | 5/2009 |
| WO | WO 2011/056907 A2 | 5/2011 |
| WO | WO 2014/096620 A1 | 6/2014 |

VALVE FOR FUEL CIRCUIT OF AN AIRCRAFT ENGINE

GENERAL TECHNICAL FIELD

The invention relates to the general field of fuel circuit architectures of aircraft engines with motive flow, tapped on an engine fuel system.

STATE OF THE ART

FIG. 1 shows a conventional fuel architecture of an aircraft engine. In such an architecture, an electric pump 11, referred to as aircraft pump, embedded in a fuel tank 10 makes it possible to send fuel in an engine fuel system 20 of the aircraft by the intermediary of a supply line 1. The fuel system 20 makes it possible to supply fuel to the engine (not shown) and to provide the hydraulic power required for the various actuators (not shown) of the blades of the engine.

This aircraft pump must be supplied electrically.

In order to avoid having systematic recourse to the aircraft pump, a jet pump 12 that operates according to the venturi effect is also integrated into the tank 10 and makes it possible to take over for the aircraft pump under certain conditions.

This jet pump 12 needs a source of hydraulic power which is constantly supplied by a fuel return line 2 tapped on the engine fuel system 20.

This return line 2 makes it possible to supply the jet pump 12 with high-pressure fuel taken from the engine fuel system 20.

It is not however desirable that fuel under pressure be arbitrarily sent to the tank 10 in order to supply the jet pump 12.

To do this, it is possible to position a motive flow valve through the return line, making it possible to obstruct the return line, under certain pressure conditions.

However, fuel leaks can occur inside such a valve. These leaks must be taken into account when dimensioning the engine fuel system 20.

Yet, it is complicated and expensive to dimension the engine fuel system 20 for each engine model for which it is desired to install a fuel return line.

PRESENTATION OF THE INVENTION

A purpose of the invention is to propose a solution that makes it possible to avoid a redimensioning of the engine fuel system.

This purpose is achieved in the framework of this invention thanks to a pressure-controlled motive flow valve, inside of which the leaks are limited.

To this effect, the invention proposes a motive flow valve for the fuel circuit of an aircraft engine comprising:
- a shaft comprising a high-pressure chamber, a low-pressure chamber, a fuel inlet and a fuel outlet, with the shaft comprising a shoulder arranged between the fuel inlet and the fuel outlet, defining an abutment surface,
- a drawer extending inside the shaft between the high-pressure chamber and the low-pressure chamber, with the drawer being configured to be displaced with respect to the shaft under the effect of a difference in pressure between the high-pressure chamber and the low-pressure chamber, between a closed position wherein the drawer obstructs the fuel inlet, and an open position wherein the drawer releases the fuel inlet in such a way as to authorise a flow of fuel from the fuel inlet to the fuel outlet, with the drawer abutting with the abutment surface in the closed position, with the drawer comprising a portion extending into an intermediate chamber located between the high-pressure chamber and the low-pressure chamber, with the drawer further comprising a channel opening on the one hand in a first part of the intermediate chamber located on a first side of the portion of the drawer and communicating with the fuel outlet in the open and closed positions, and on the other hand in a second part of the intermediate chamber located on a second side of the portion of the drawer, opposite the first side, that does not communicate with the fuel inlet or with the fuel outlet in the open and closed positions, in such a way as to balance a pressure of the fuel on each side of the portion of the drawer in the intermediate chamber, and
- a first sealing element interposed between the abutment surface and the drawer in the closed position, in such a way as to limit a fuel leak between the fuel inlet and the fuel outlet in the closed position.

Preferentially, the first sealing element is arranged in a groove arranged on the abutment surface of the shaft, and arranged in such a way as to be in contact with the drawer in the closed position.

Preferentially, the shaft comprises a first tubular part wherein is arranged the fuel inlet, with the first part having at one of its ends a first inner diameter, and a second tubular part wherein is arranged the fuel outlet, with the second part having at one of its ends a second inner diameter less than the first inner diameter, with the first and second parts being assembled together in such a way that the ends of the first and second parts are positioned in contact with each other by forming the shoulder.

More preferentially, the first sealing element is arranged on the abutment surface in such a way as to be, in the closed position, on the one hand in contact with an end surface of the first part, and on the other hand in contact with the drawer.

Preferentially, the valve comprises a second sealing element arranged between the fuel inlet and the second part of the intermediate chamber, in such a way as to limit a fuel leak between the fuel inlet and the fuel outlet via the second part of the intermediate chamber in the closed position.

According to an embodiment of the invention, the valve comprises a third sealing element arranged between the high-pressure chamber and the intermediate chamber, in such a way as to limit a fuel leak between the high-pressure chamber and the intermediate chamber.

According to an embodiment of the invention, the valve comprises a fourth sealing element arranged between the low-pressure chamber and the intermediate chamber, in such a way as to limit a fuel leak between the low and the intermediate chamber.

The invention also has for object a fuel circuit of an aircraft engine comprising:
  a fuel tank,
  an engine fuel system comprising:
    a low-pressure pump connected to the fuel tank, with the low-pressure pump able to increase a pressure of a flow of low-pressure fuel coming from the fuel tank with a variable pressure differential,
    a high-pressure pump connected to the low-pressure pump able to provide a high-pressure fuel flow;
  a fuel return line connected to the engine fuel system, said line able to convey a high-pressure flow to the fuel tank, a motive flow valve such as described hereinabove, of which the low-pressure chamber and the high-pressure chamber are respectively connected to the flow of low-pressure fuel upstream and downstream of the low-pressure pump, the fuel inlet communicating with the fuel return line downstream of the engine fuel system, the fuel outlet communicating with the fuel return line upstream of the fuel tank.

The invention also has for object an aircraft comprising an engine supplied with fuel by a fuel circuit such as described hereinabove.

PRESENTATION OF THE FIGURES

Other characteristics, purposes and advantages of the invention shall appear in the following description, which is purely illustrative and not restricted, and which must be read with regards to the annexed drawings wherein, in addition to FIG. 1 already discussed:

Figure 4:
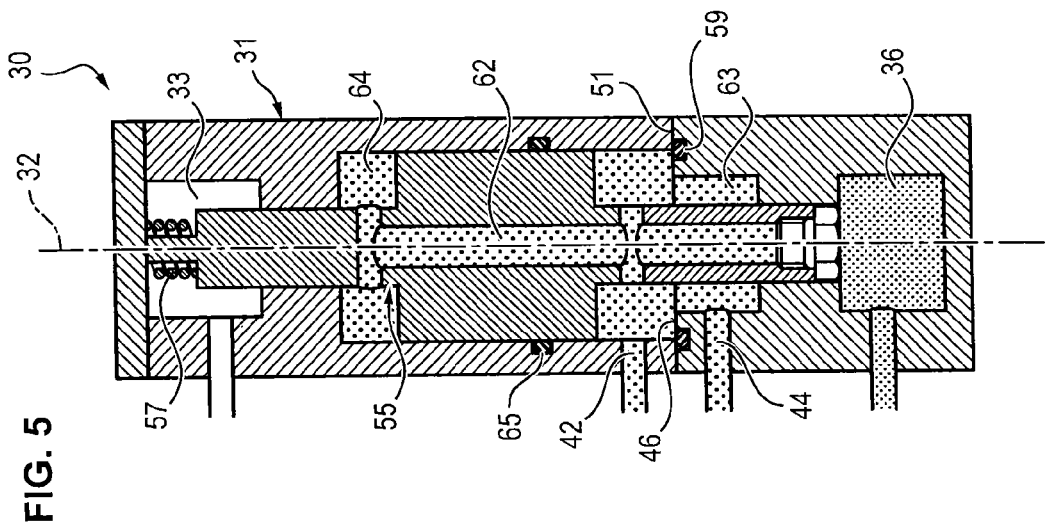
Figure 5:
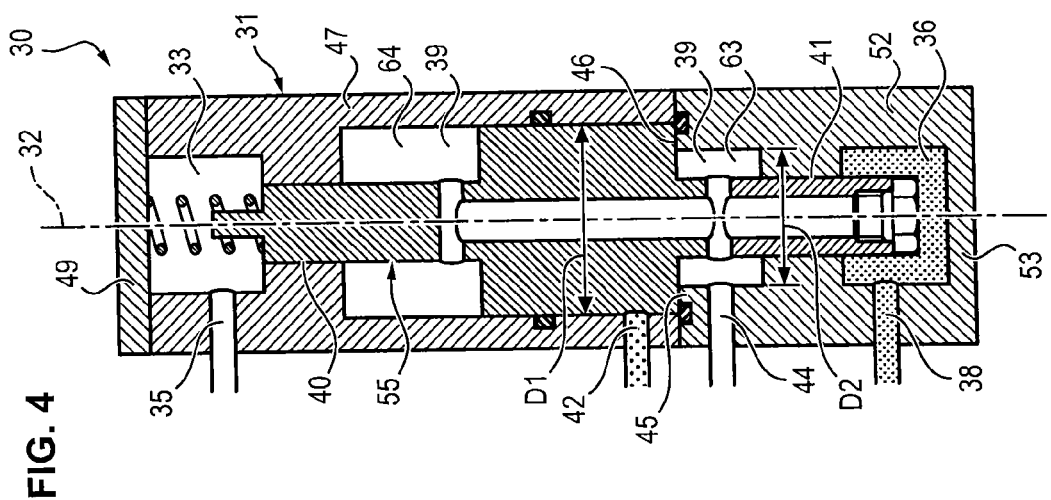
Figure 6:
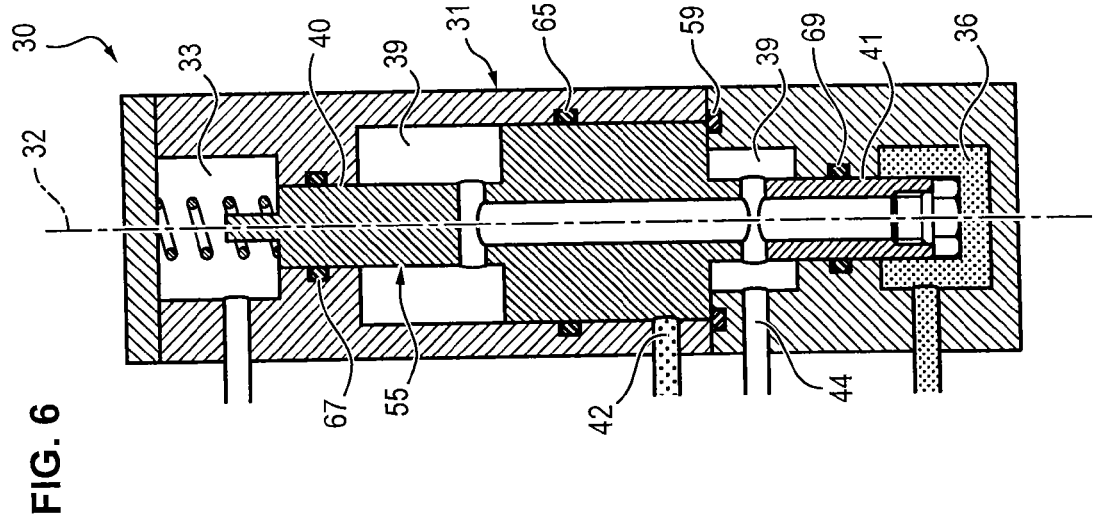

FIG. 4 diagrammatically shows the motive flow valve in a closed position according to an embodiment of the invention;

FIG. 5 diagrammatically shows the motive flow valve in an open position according to the embodiment of the invention shown in FIG. 4;

FIG. 6 diagrammatically shows the motive flow valve in a closed position according to another embodiment of the invention than that shown in FIGS. 4 and 5.

In all of the figures, similar elements bear identical references.

DETAILED DESCRIPTION

Figure 1:
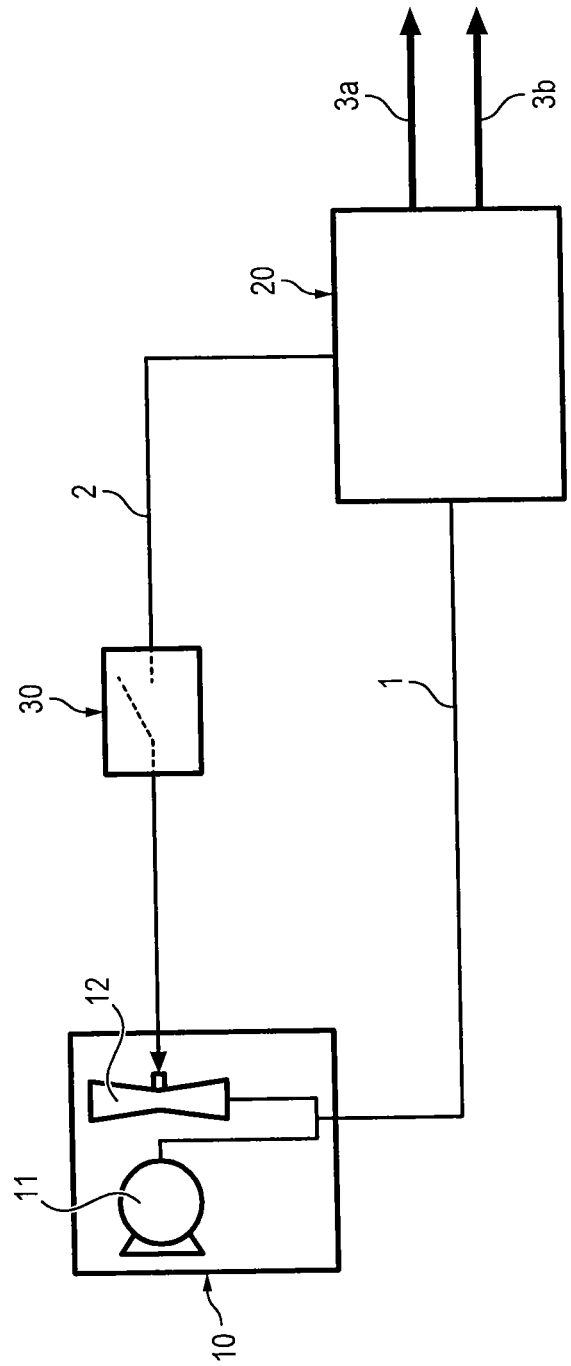
Figure 2:
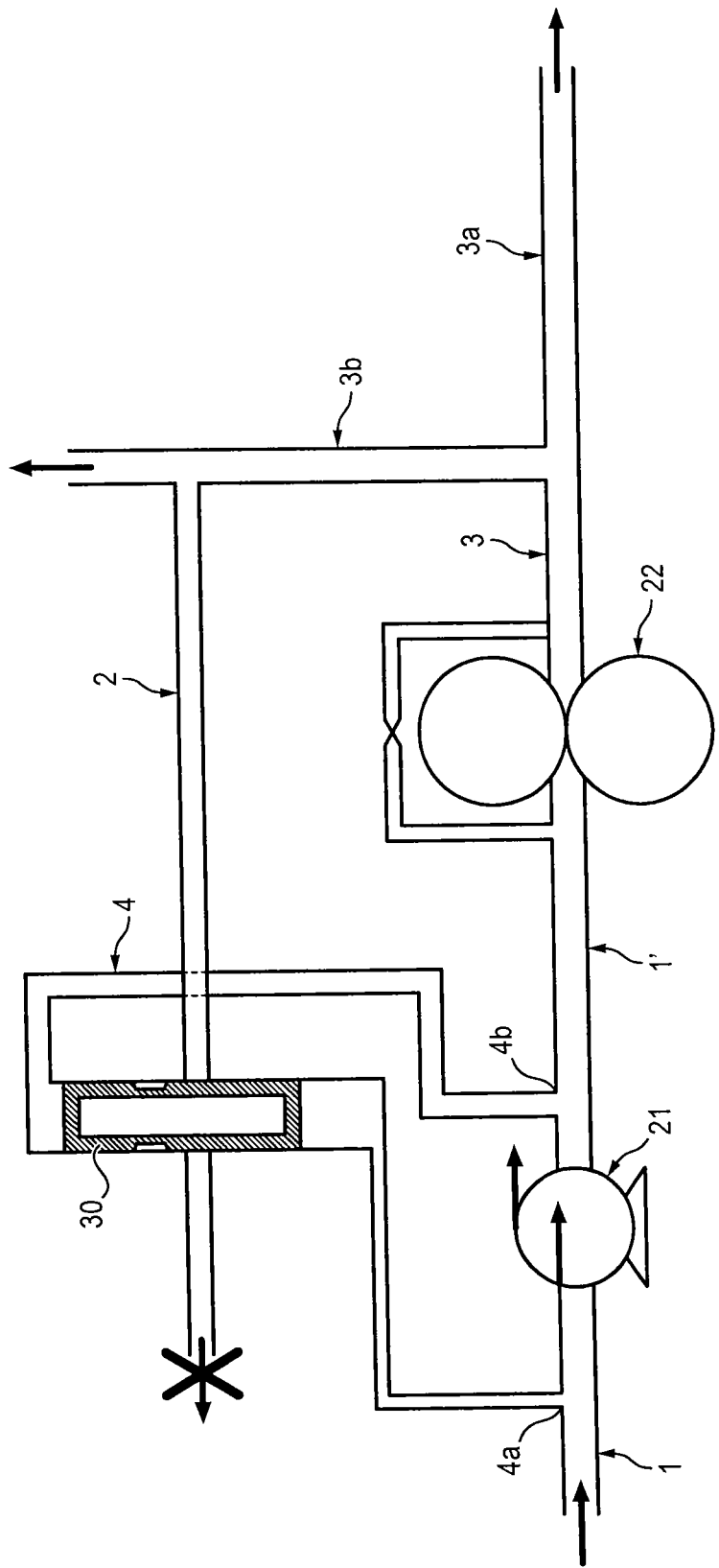
FIG. 2 shows an operation of a fuel circuit in a closed position of a motive flow valve.
Figure 3:
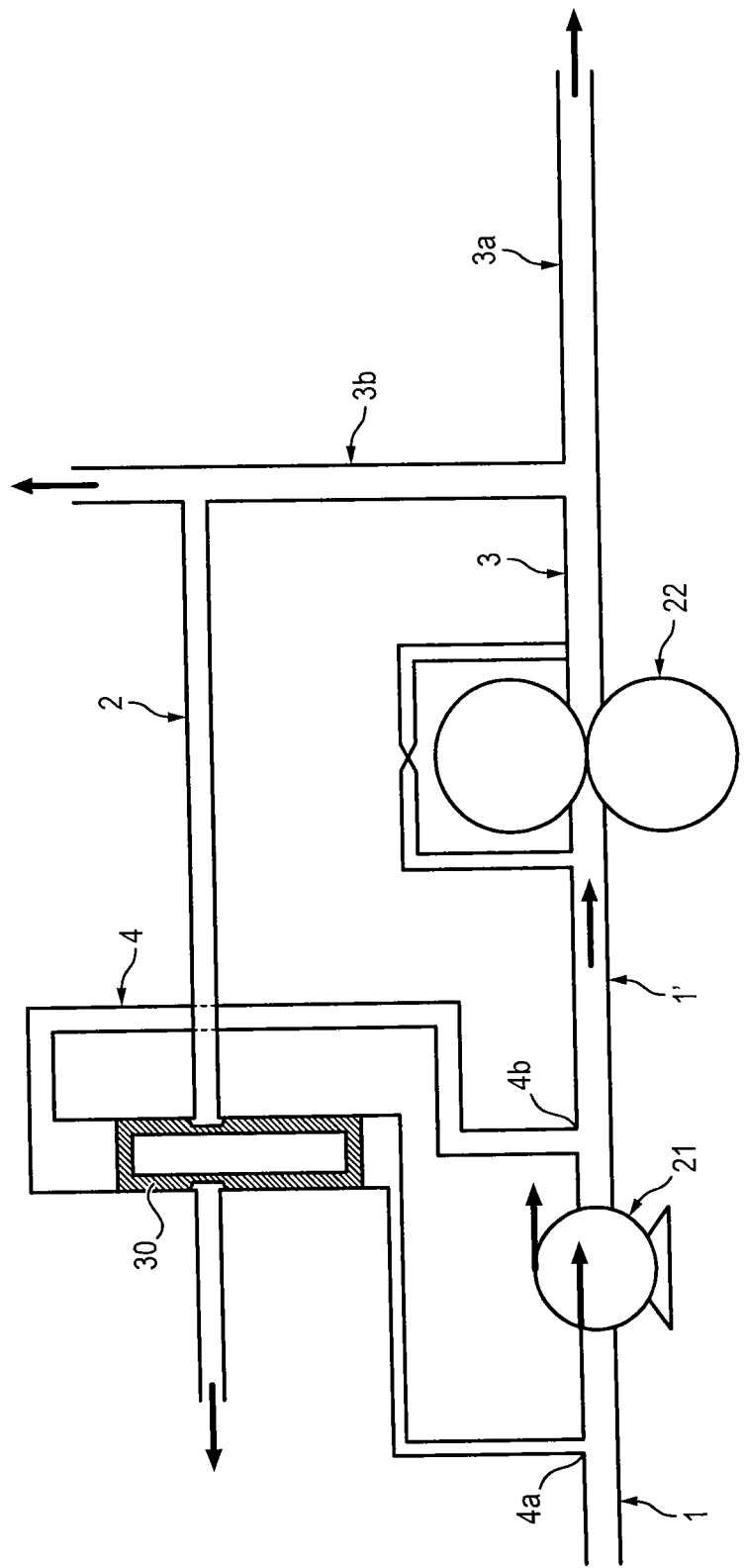
FIG. 3 shows an operation of a fuel circuit in an open position of a motive flow valve.

FIGS. 2 and 3 show an operation of the fuel circuit in two positions of the motive flow valve.

The fuel system 20 comprises a low-pressure pump 21 able to increase the pressure of the flow of fuel coming from the tank 10 with a variable pressure differential $\Delta P$. The low-pressure pump 21 is connected to the fuel tank 10 by the supply line 1.

The low-pressure pump 21 is followed directly downstream by a high-pressure pump 22. The high-pressure pump 22 is connected to the low-pressure pump 21 by the intermediary of a line 1'. The high-pressure pump 22 is a displacement pump. The high-pressure pump 22 is able to provide a high-pressure fuel flow. The pressure of the flow of fuel downstream of the high-pressure pump 22 is determined by the characteristics of the engine fuel system 20 downstream of the high-pressure pump 22. It is therefore not the high-pressure pump 22 itself that increases the pressure of the flow of fuel coming from the low-pressure pump 21.

It is specified here that "low pressure" means a pressure upstream of the high-pressure pump 22 and that "high pressure" means a pressure downstream of the high-pressure pump 22.

The flow of fuel coming from the high-pressure pump 22 is then directed on the one hand to the engine (not shown) and on the other hand to the various actuators (not shown) of the blades of the engine by the intermediary of respective lines 3a, 3b.

Of course the fuel circuit comprises other known components such as filters, heat exchangers, flow regulators, etc. of which the description is not required here for the understanding of the invention.

The fuel circuit also comprises a motive flow valve 30 arranged in an actuating line 4 of which a first end 4a is connected upstream of the low-pressure pump 21 and of which a second end 4b is connected downstream of the low-pressure pump 21.

The motive flow valve is arranged to switch between a closed position (see FIG. 2) and an open position (see FIG. 3) according to the pressure differential between the first and second ends 4a, 4b of the actuating line 4.

In open position, the valve 30 makes it possible to place the fuel return line 2 in communication with the fuel tank 10 so that the high-pressure flow is sent into the jet pump of this fuel tank 10.

In closed position, the valve 30 obstructs the fuel return line 2.

Indeed, the applicant has shown that the pressure differential generated by the low-pressure pump 21 is variable and depends:

on the rotation speed of the low-pressure pump 21 of the fuel system mechanically linked to the rotation speed N of the engine of the aircraft;

on the rate of the flow of fuel at the inlet of the engine;

on the manufacturing tolerances of the low-pressure pump 21;

on the temperature at the inlet of the low-pressure pump 21.

Furthermore, the applicant has shown that the pressure differential $\Delta P$ generated by the low-pressure pump 21 is an indicator of the rotation speed N of the engine.

Indeed, it is not desirable that the motive flow valve 30 send a high-pressure fuel flow for certain rotation speeds N of the engine. These speeds can be defined by a range of rotation speeds N of the engine of the aircraft, for example greater than 35% and strictly less than 50%.

As will have been understood the actuating of the motive flow valve 30 is a hydraulic and not electric device and therefore does not require any auxiliary arrangement in order to actuate it. This is a passive device.

FIGS. 4 and 5 show respectively the motive flow valve 30 in the closed and open position, according to an embodiment of the invention.

The motive flow valve 30 comprises a tubular shaft 31 extending according to a longitudinal axis 32.

The shaft 31 comprises a low-pressure chamber 33 arranged at a first end of the shaft 31. The low-pressure chamber 33 is connected to the first end 4a of the actuating line 4. In the example shown in FIGS. 4 and 5, the low-pressure chamber 33 is connected to the actuating line 4 by a radial opening 35. A pressure of the low-pressure chamber 33 is therefore equal to a pressure of the fuel upstream of the low-pressure pump 21.

The shaft 31 also comprises a high-pressure chamber 36 arranged at a second end of the shaft 31, opposite the first end along the longitudinal axis 32. The high-pressure chamber 36 is connected to the second end 4b of the actuating line 4. In the example shown in FIGS. 4 and 5, the low-pressure chamber 36 is connected to the actuating line 4 by a radial opening 38. A pressure of the high-pressure chamber 36 is therefore equal to a pressure of the fuel downstream of the low-pressure pump 21.

The shaft 31 further comprises an intermediate chamber 39 extending between the high-pressure chamber and the low-pressure chamber 36. The intermediate chamber 39 communicates with the low-pressure chamber 33 via a channel 40, and with the high-pressure chamber 36 via a channel 41.

A fuel inlet 42 is arranged in a radial wall of the shaft 31. The fuel inlet 42 communicates with the return line 2 and the intermediate chamber 39. The fuel inlet 42 is intended to receive fuel coming from the engine fuel system 20.

A fuel outlet 44 is also arranged in the radial wall of the shaft 31. The fuel outlet 44 communicates with the intermediate chamber 39 and the return line 2. The fuel outlet 44 is intended, in the open position, to release fuel to the fuel tank 10. The fuel outlet 44 is arranged between the fuel inlet 42 and the high-pressure chamber 36.

The radial wall of the shaft 31 comprises a shoulder 45 arranged between the fuel inlet 42 and the fuel outlet 44. The shoulder 45 defines an abutment surface 46 arranged perpendicularly to the longitudinal axis 32.

The shaft 31 comprises a first part 47 wherein is arranged the fuel inlet 42. The first part 47 comprises a first end whereon a cover 49, forming the first end of the shaft 31, is added. The first part 47 also comprises, opposite the cover 49, a second end comprising a surface 51 arranged perpendicularly to the longitudinal axis 32 and having a first inner diameter D1.

The shaft 31 further comprises a second part 52 wherein is arranged the fuel outlet 44. The second part 52 comprises a bottom 53 forming the second end of the shaft 31. The second part 52 also comprises, opposite the bottom 53, an end comprising a surface arranged perpendicularly to the longitudinal axis 32 and having a second inner diameter D2. The second inner diameter D2 is less than the first inner diameter D1.

The first part 47 and the second part 52 are assembled together in such a way that the surface 51 of the second end of the first part 47 and the surface of the end of the second part 52 opposite the bottom 53 are in contact with one another forming the shoulder 45. The surface of the end of the second part 52 opposite the bottom 53 forms the abutment surface 46.

The motive flow valve 30 also comprises a tubular drawer 55 extending inside the shaft 31 between the low-pressure chamber 33 and the high-pressure chamber 36. The drawer 55 is configured to be displaced with respect to the shaft 31 along the longitudinal axis 32 under the effect of the difference in pressure between the low-pressure chamber 33 and the high-pressure chamber 36. As such, the displacement of the drawer 55 relatively to the shaft 31 depends directly on the pressure differential ΔP of the low-pressure pump 21.

The drawer 55 comprises a first portion extending from the low-pressure chamber 33 to the intermediate chamber 39 and passing through the channel 40. A diameter of the first portion is substantially equal to a diameter of the channel 40. The first portion is connected to the cover 49 of the shaft 31 by the intermediary of an elastic return element 57 arranged in the low-pressure chamber 33. In open and closed position, the elastic return element 57 works as compression.

The drawer 55 also comprises a second portion connected to the first portion and extending into the intermediate chamber 39. A diameter of the second portion is substantially equal to the first diameter D1 of the first part 47 of the shaft 31. In closed position, the second portion of the drawer 55 abuts against the abutment surface 46, and obstructs the fuel inlet 42. In open position, the second portion of the drawer 55 is positioned in the intermediate chamber 39 at a distance from the abutment surface 46, in such a way as to release the fuel inlet 42 and allow for a flow of fuel from the fuel inlet 42 to the fuel outlet 44.

It is understood that in the case of a leak between the inlet and the fuel outlet 42 and 44, the operation of the high-pressure pump 22 is disturbed and that the high-pressure pump 22 consequently requires dimensioning.

A first annular sealing element 59 is arranged in a groove with complementary shape, arranged on the abutment surface 46. The first sealing element 59 is arranged in such a way as to be in contact with the second portion of the drawer 55 in the closed position.

The first sealing element 59 is for example an O-ring.

The first sealing element 59 makes it possible to limit fuel leaks between the fuel inlet 42 and the fuel outlet 44 in closed position. As such, redimensioning the high-pressure pump 22 of the engine fuel system 20 for each engine model is avoided.

Having arranged a shoulder 45 between the inlet and the fuel outlet 42 and 44 in order to be able to position the first sealing element 59 on the abutment surface 46 of the shoulder 45 is particularly advantageous, in that in this configuration, the drawer 55 cannot abut against the first sealing element 59 and pull it off, when the drawer 55 is displaced along the longitudinal axis 32 with respect to the shaft 31.

The first sealing element 59 is arranged on the abutment surface 46 in such a way as to be, in the closed position, on the one hand in contact with the surface 51 of the second end of the first part 47 of the shaft 31, and on the other hand in contact with the abutment surface 46. In this way, the first sealing element 59 is maintained in position in the shaft 31.

The drawer 55 also comprises a third portion, connected to the second portion, extending from the intermediate chamber 39 to the high-pressure chamber 36 and passing through the channel 41. A diameter of the third portion is substantially equal to a diameter of the channel 41.

The drawer 55 further comprises a channel 62 extending along the longitudinal axis 32. The channel 62 opens on the one hand into a first part 63 of the intermediate chamber 39 located on a first side of the second portion of the drawer 55 and communicating with the fuel outlet 44 in the closed position and with the inlet and the fuel outlet 42 and 44 in the closed and open positions. The channel 62 opens on the other hand into a second part 64 of the intermediate chamber 39 located on a second side of the second portion of the drawer and which does not communicate with the fuel inlet 42 or with the fuel outlet 44 in the open and closed positions. The third portion of the drawer 55 comprises at its free end a threaded element, positioned longitudinally, that cooperates with a complementary threading arranged in the channel 62, in such a way as to obstruct the channel 62.

The channel 62 of the drawer 55 makes it possible to balance a pressure of the fuel on each side of the second portion of the drawer 55, and to prevent as such the drawer 55 from being displaced untimely under the effect of the pressure of the fuel in the first portion 47 of the intermediate chamber 39.

A second annular sealing element 65 is arranged in a groove with complementary shape, arranged on a radial surface of the intermediate chamber 39, between the fuel outlet 44 and the second part 64 of the intermediate chamber 39. The second sealing element 65 is in contact with the second portion of the drawer 55 in the closed position and in the open position, in such a way that the drawer 55 cannot abut against the second sealing element 65 and pull it off, when the drawer 55 is displaced along the longitudinal axis 32 with respect to the shaft 31.

The second sealing element 65 is for example an O-ring.

The second sealing element 65 furthermore makes it possible to limit fuel leaks between the fuel inlet 42 and the fuel outlet 44 via the second part 64 of the intermediate chamber 39. As such, redimensioning the high-pressure pump 22 of the engine fuel system 20 for each engine model is avoided.

FIG. 6 shows a motive flow valve 30 in the closed position, according to another embodiment of the invention.

According to this other embodiment of the invention, the motive flow valve 30 further comprises a third sealing element 67 arranged in a groove with complementary shape, arranged on a radial surface of the channel 40 connecting the low-pressure chamber 33 and the intermediate chamber 39. The third sealing element 67 is in contact with the first portion of the drawer 55 in the closed position and in the open position, in such a way that the drawer 55 cannot abut against the third sealing element 67 and pull it off, when the drawer 55 is displaced along the longitudinal axis 32 with respect to the shaft 31.

The third sealing element 67 is for example an O-ring.

The third sealing element 67 makes it possible to limit the fuel leaks between the low-pressure chamber 33 and the intermediate chamber 39.

The motive flow valve 30 also comprises a fourth sealing element 69 arranged in a groove with complementary shape, arranged on a radial surface of the channel 41 connecting the high-pressure chamber 36 and the intermediate chamber 39. The fourth sealing element 69 is arranged in such a way as to be in contact with the third portion of the drawer 55 in the closed position and in the open position, in such a way that the drawer 55 cannot abut against the fourth sealing element 69 and pull it off, when the drawer 55 is displaced along the longitudinal axis 32 with respect to the shaft 31.

The fourth sealing element 69 is for example an O-ring.

The fourth sealing element 69 makes it possible to limit the fuel leaks between the high-pressure chamber 36 and the intermediate chamber 39.

The invention claimed is:

1. A motive flow valve for a fuel circuit of an aircraft engine, comprising:
    a shaft comprising a low-pressure chamber, a high-pressure chamber, a fuel inlet and a fuel outlet,
    a drawer extending inside the shaft between the high-pressure chamber and the low-pressure chamber, the drawer being configured to be displaced with respect to the shaft under the effect of a difference in pressure between the high-pressure chamber and the low-pressure chamber, between a closed position wherein the drawer obstructs the fuel inlet, and an open position wherein the drawer releases the fuel inlet in such a way as to allow for a flow of fuel from the fuel inlet to the fuel outlet,
    wherein the shaft comprises a shoulder arranged between the fuel inlet and the fuel outlet, defining an abutment surface with which the drawer abuts in the closed position, and a first sealing element interposed between the abutment surface and the drawer in the closed position, in such a way as to limit a fuel leak between the fuel inlet and the fuel outlet in the closed position, wherein the drawer comprises a portion extending in an intermediate chamber located between the high-pressure chamber and the low-pressure chamber, the drawer further comprising a channel exiting on the one hand in a first part of the intermediate chamber located on a first side of the portion of the drawer and communicating with the fuel outlet in the open and closed positions, and on the other hand in a second part of the intermediate chamber located on a second side of the portion of the drawer, opposite the first side, that only communicates with the fuel inlet or with the fuel outlet via the channel in the open and closed positions, in such a way as to balance a pressure of the fuel of each side of the portion of the drawer in the intermediate chamber.

2. The motive flow valve according to claim 1, wherein the first sealing element is arranged in a groove arranged on the abutment surface of the shaft, and arranged in such a way as to be in contact with the drawer in the closed position.

3. The motive flow valve according to claim 1, wherein the shaft comprises:
    a first tubular part wherein is arranged the fuel inlet, with the first part having at one of its ends a first inner diameter,
    a second tubular part wherein is arranged the fuel outlet, with the second part having at one of its ends a second inner diameter less than the first inner diameter, with the first and second parts being assembled together in such a way that the ends of the first and second parts are positioned in contact with each other by forming the shoulder.

4. The motive flow valve according to claim 3, wherein the first sealing element is arranged on the abutment surface in such a way as to be, in the closed position, on the one hand in contact with an end surface of the first part, and on the other hand in contact with the drawer.

5. The motive flow valve according to claim 1, comprising a second sealing element arranged between the fuel inlet and the second part of the intermediate chamber, in such a way as to limit a fuel leak between the fuel inlet and the fuel outlet via the second part of the intermediate chamber in the closed position.

6. The motive flow valve according to claim 1, comprising a third sealing element arranged between the high-pressure chamber and the intermediate chamber, in such a way as to limit a fuel leak between the high-pressure chamber and the intermediate chamber.

7. The motive flow valve according to claim 1, comprising a fourth sealing element arranged between the low-pressure chamber and the intermediate chamber, in such a way as to limit a fuel leak between the low-pressure chamber and the intermediate chamber.

8. A fuel circuit of an aircraft engine comprising:
    a fuel tank;
    an engine fuel system comprising:
        a low-pressure pump connected to the fuel tank, with the low-pressure pump to increase a pressure of a flow of low-pressure fuel coming from the fuel tank with a variable pressure differential, and
        a high-pressure pump connected to the low-pressure pump to provide a high-pressure fuel flow;
    a fuel return line connected to the engine fuel system, said line to convey a high-pressure flow to the fuel tank; and
    the motive flow valve according to claim 1, of which the low-pressure chamber and the high-pressure chamber are respectively connected to the flow of low-pressure fuel upstream and downstream of the low-pressure pump, the fuel inlet communicating with the fuel return line downstream of the engine fuel system, the fuel outlet communicating with the fuel return line upstream of the fuel tank.

9. An aircraft comprising an engine supplied with fuel by the fuel circuit according to claim 8.

* * * * *